(12) United States Patent
Andrews

(10) Patent No.: US 9,361,295 B1
(45) Date of Patent: Jun. 7, 2016

(54) APPARATUS, METHOD AND GRAPHICAL USER INTERFACE FOR PROVIDING A SOUND LINK FOR COMBINING, PUBLISHING AND ACCESSING WEBSITES AND AUDIO FILES ON THE INTERNET

(76) Inventor: Christopher C. Andrews, Los Altos, CA (US)

( * ) Notice: Subject to any disclaimer, the term of this patent is extended or adjusted under 35 U.S.C. 154(b) by 1123 days.

(21) Appl. No.: 11/985,620

(22) Filed: Nov. 16, 2007

Related U.S. Application Data

(60) Provisional application No. 60/859,394, filed on Nov. 16, 2006.

(51) Int. Cl.
*G06F 17/30* (2006.01)

(52) U.S. Cl.
CPC ..................... *G06F 17/30* (2013.01)

(58) Field of Classification Search
CPC ....................................................... G06F 17/30
USPC ......................................................... 715/205
See application file for complete search history.

(56) References Cited

U.S. PATENT DOCUMENTS

| | | | |
|---|---|---|---|
| 5,767,845 A | 6/1998 | Oashi et al. | |
| 6,094,671 A * | 7/2000 | Chase et al. | 709/201 |
| 6,526,411 B1 | 2/2003 | Ward | |
| 6,748,395 B1 | 6/2004 | Picker et al. | |
| 6,882,708 B1 * | 4/2005 | Bedingfield et al. | 379/88.18 |
| 6,909,999 B2 * | 6/2005 | Thomas et al. | 703/1 |
| 7,233,407 B1 * | 6/2007 | Simchik et al. | 358/1.15 |
| 7,349,923 B2 | 3/2008 | Spring et al. | |
| 7,680,288 B2 | 3/2010 | Melchior et al. | |
| 7,752,202 B2 | 7/2010 | Kobori et al. | |
| 7,870,197 B2 | 1/2011 | Lewis et al. | |
| 8,452,887 B1 | 5/2013 | Stier | |
| 8,589,169 B2 * | 11/2013 | Bradley et al. | 704/270.1 |
| 8,606,383 B2 | 12/2013 | Jung et al. | |
| 8,845,337 B1 | 9/2014 | Hu et al. | |
| 2001/0023450 A1 * | 9/2001 | Chu | 709/231 |
| 2002/0053078 A1 | 5/2002 | Holtz et al. | |
| 2002/0091762 A1 * | 7/2002 | Sohn et al. | 709/203 |
| 2002/0099552 A1 | 7/2002 | Rubin et al. | |

(Continued)

OTHER PUBLICATIONS

"Grace Digital Audio User Guide GDI-IR1000"—Sirius Retail, May 2010 http://www.siriusretail.com/product/Product_Families/SIRIUS/tab_inc/pdf/GDI-IR1000_UserGuide.pdf.

(Continued)

*Primary Examiner* — Kavita Padmanabhan
*Assistant Examiner* — Tionna Burke
(74) *Attorney, Agent, or Firm* — Haverstock & Owens LLP

(57) ABSTRACT

A system for linking together and publishing websites and audio files together, as one unit, by anyone on the Internet, generating a single link referred to as a Sound Link that is able to then be accessed and launched from anywhere on the Internet by a user, generating a combination visual and audio experience for the user who clicks on the Sound Link that was generated. The Sound Link launches the website while playing the audio file associated with that website. A website is any content that is accessible on the Internet including full websites and their components including text documents, graphics, games, photos, advertisement, files, video, and other website content. Audio includes any audio file that is accessible on the Internet. The system is referred to as an Audio-Website Link Generation and Access System for purposes of describing the system.

24 Claims, 6 Drawing Sheets

(56) References Cited

U.S. PATENT DOCUMENTS

| | | |
|---|---|---|
| 2002/0107884 A1* | 8/2002 | Banerjee et al. ............ 707/501.1 |
| 2002/0147728 A1 | 10/2002 | Goodman et al. |
| 2003/0030659 A1* | 2/2003 | Wu ............................... 345/716 |
| 2003/0069893 A1 | 4/2003 | Kanai et al. |
| 2003/0135857 A1 | 7/2003 | Pendakur et al. |
| 2004/0148353 A1 | 7/2004 | Karaoguz et al. |
| 2004/0181413 A1 | 9/2004 | Lui et al. |
| 2004/0201609 A1* | 10/2004 | Obrador ........................ 345/723 |
| 2005/0021862 A1* | 1/2005 | Schroeder et al. ............. 709/246 |
| 2005/0038819 A1 | 2/2005 | Hicken et al. |
| 2005/0038826 A1* | 2/2005 | Bae et al. ...................... 707/200 |
| 2005/0234983 A1 | 10/2005 | Plastina et al. |
| 2006/0195512 A1 | 8/2006 | Rogers et al. |
| 2006/0242106 A1 | 10/2006 | Bank |
| 2007/0118873 A1 | 5/2007 | Houh et al. |
| 2007/0299873 A1 | 12/2007 | Jones et al. |
| 2008/0103906 A1 | 5/2008 | Singh |
| 2008/0114805 A1 | 5/2008 | Nord |
| 2008/0178251 A1 | 7/2008 | Shin |
| 2008/0201651 A1 | 8/2008 | Hong et al. |
| 2008/0243923 A1 | 10/2008 | Mazor et al. |
| 2009/0150445 A1 | 6/2009 | Herberger et al. |
| 2009/0164034 A1 | 6/2009 | Cohen et al. |
| 2009/0164902 A1 | 6/2009 | Cohen et al. |
| 2009/0186631 A1 | 7/2009 | Masarie, Jr. |
| 2009/0198357 A1 | 8/2009 | Logan et al. |
| 2009/0199083 A1 | 8/2009 | Sar et al. |
| 2010/0009698 A1 | 1/2010 | Yang et al. |
| 2010/0061197 A1 | 3/2010 | Yoshikawa et al. |
| 2010/0106852 A1 | 4/2010 | Kindig et al. |
| 2010/0114934 A1 | 5/2010 | Martensson |
| 2010/0125571 A1 | 5/2010 | White |
| 2010/0180753 A1 | 7/2010 | Chou et al. |
| 2010/0235466 A1 | 9/2010 | Jung et al. |
| 2010/0250587 A1 | 9/2010 | Schmitz |
| 2010/0257069 A1 | 10/2010 | Levy et al. |
| 2011/0040397 A1 | 2/2011 | Kraemer et al. |
| 2011/0061108 A1 | 3/2011 | Arrasvuori et al. |
| 2011/0072350 A1 | 3/2011 | Bachtiger |
| 2012/0254223 A1 | 10/2012 | Jotanovic et al. |
| 2013/0031208 A1 | 1/2013 | Linton et al. |
| 2013/0346075 A1 | 12/2013 | Felkai et al. |

OTHER PUBLICATIONS

SpeakEasy Voice Recorder Lite by Zarboo Software, Version 2.1 updated on Feb. 17, 2010 and available on iTunes; https://itunes.apple.com/us/app/speakeasy-voice-recorder-lite/id342738702.

\* cited by examiner

| Topic | Date | Generator | Rating |
|---|---|---|---|
| Sounds<br>My Sound Link | 10/1/07<br>My Science Link | Chris<br>My Sound Link | ☆☆☆☆☆<br>My Humor Link |
| Humor<br>My Humor Link | 9/1/07<br>My Humor Link | <br>My Science Link | ☆☆☆☆<br>My Sound Link |
| Science<br>My Science Link | 8/1/07<br>My Sound Link | <br>My Humor Link | ☆☆<br>My Science Link |

200, 200', 200", 200'''

WEBSITE

Dear Friend,
Click on
My Sound Link     ~202

EMAIL

Dear Friends,
Today's blog
is about
My Sound Link     ~204

BLOG

Fig. 2

300 www.mysite.com

Website URL www.musicsite.com/audio.mp3

Audio File URL

My Favorite Things

Title of Sound Link

Chris

Name of Generator

This is my favorite website together with my favorite music

Description

GENERATE

Fig. 3

APPARATUS, METHOD AND GRAPHICAL USER INTERFACE FOR PROVIDING A SOUND LINK FOR COMBINING, PUBLISHING AND ACCESSING WEBSITES AND AUDIO FILES ON THE INTERNET

RELATED APPLICATION(S)

This application claims priority under 35 U.S.C. §119(e) of the co-owned U.S. Provisional Patent Application, Ser. No. 60/859,394, filed Nov. 16, 2006, and entitled, "AN APPARATUS, METHOD AND GRAPHICAL USER INTERFACE FOR PROVIDING A SOUND LINK FOR COMBINING, PUBLISHING AND ACCESSING WEBSITES AND AUDIO FILES ON THE INTERNET." The Provisional Patent Application, Ser. No. 60/859,394, filed Nov. 16, 2006, and entitled, "AN APPARATUS, METHOD AND GRAPHICAL USER INTERFACE FOR PROVIDING A SOUND LINK FOR COMBINING, PUBLISHING AND ACCESSING WEBSITES AND AUDIO FILES ON THE INTERNET" is also hereby incorporated by reference in its entirety.

FIELD OF THE INVENTION

The present invention relates to the Internet. More specifically, the present invention relates to providing a Sound Link for combining, publishing and accessing websites and audio files on the Internet.

BACKGROUND OF THE INVENTION

In the past, the Internet has been essentially a quiet experience. The basic foundation of the Internet, websites, rarely have any audio associated with them that is relevant to that website. If the websites do have audio, the audio is not generally related to the content of the website. An exception to the Internet being quiet is music and video that are offered on the Internet, but in these cases, the website is used more as a delivery vehicle, to allow the user to stream or download the music or video, rather than to have the audio describe, enhance or relate to the website itself.

When there is audio associated with a website, the audio is generally hosted on the servers of the website owner, and the webmaster of the website placed the audio, meaning the audio location and the means for accessing that audio file, are directly on the website server within the website source code html. Or the webmaster uses audio that is not directly on the servers of the website, but it is still the webmaster, who has access to the source code and html of the website and specialized skills, who adds audio to the website.

The webmaster has specialized skills to add audio to a website, plus the webmaster has special access to be able to modify the source code or html of the website.

SUMMARY OF THE INVENTION

A system for linking together and publishing websites and audio files together, as one unit, by anyone on the Internet, generating a single link referred to as a Sound Link that is able to then be accessed and launched from anywhere on the Internet by a user, generating a combination visual and audio experience for the user who clicks on the Sound Link that was generated. The Sound Link launches the website while playing the audio file associated with that website. A website is any content that is accessible on the Internet including full websites and their components including text documents, graphics, games, photos, advertisement, files, video, and other website content. Audio includes any audio file that is accessible on the Internet. The system is referred to as an Audio-Website Link Generation and Access System for purposes of describing the system.

In one aspect, an apparatus for generating a Sound Link comprises a processor and an application processed by the processor for generating the Sound Link including a website address for a website and an audio file location for an audio file. The application includes a graphical user interface for receiving input. The input includes a website address, an audio file address and a name. The website is hosted by a first host and the audio file is hosted by a second host. The website is configured to open approximately simultaneously with the audio file.

In another aspect, a method of presenting a website and an audio file utilizing a computing device comprises inputting information into the computing device, processing the information using an application to generate a Sound Link including a website address of the website and an audio file location of the audio file, displaying the website and playing the audio file approximately simultaneously with displaying the website. The information is input using a graphical user interface. The input includes the website address, the audio file location and a name. The website and the audio file are presented on a single page. The website and the audio file are presented on two separate pages. The method further comprises emailing the Sound Link.

In another aspect, a system for administering a Sound Link utilizing a computing device comprises a generate module for generating the Sound Link including a website address for a website and an audio file location for an audio file and a user module operatively coupled with the generate module, the user module for presenting the Sound Link. The system further comprises a recording module operatively coupled with the generate module, the recording module for recording an audio file. The generate module is further configured for editing, deleting and managing the Sound Link. The generate module further comprises a graphical user interface for receiving input. The input includes a website address, an audio file address and a name.

In another aspect, an interface presented on a computing device, the interface for generating a Sound Link comprises a website component for receiving website location information, an audio component for receiving audio file location information, a name component for receiving a name of the Sound Link and a submit component operatively coupled to the website component, the audio component and the name component, the submit component to submit the website location, the audio file location and the name to be processed by the computing device.

In yet another aspect, a Sound Link presented on a computing device, the Sound Link comprises a website address of a website and an audio file location of an audio file. The website and the audio file are presented approximately simultaneously when the Sound Link is clicked. A generator of the Sound Link is not an owner of the website. The Sound Link includes an indicator to distinguish the Sound Link from a standard link.

BRIEF DESCRIPTION OF THE DRAWINGS

FIG. 2 illustrates several of the main ways in which a Sound Link is able to be accessed by a user, in accordance with the present invention.

FIG. 3 illustrates a graphical user interface that is used to receive data to generate a Sound Link in accordance with the present invention.

DETAILED DESCRIPTION OF THE PREFERRED EMBODIMENT

Figure 1:
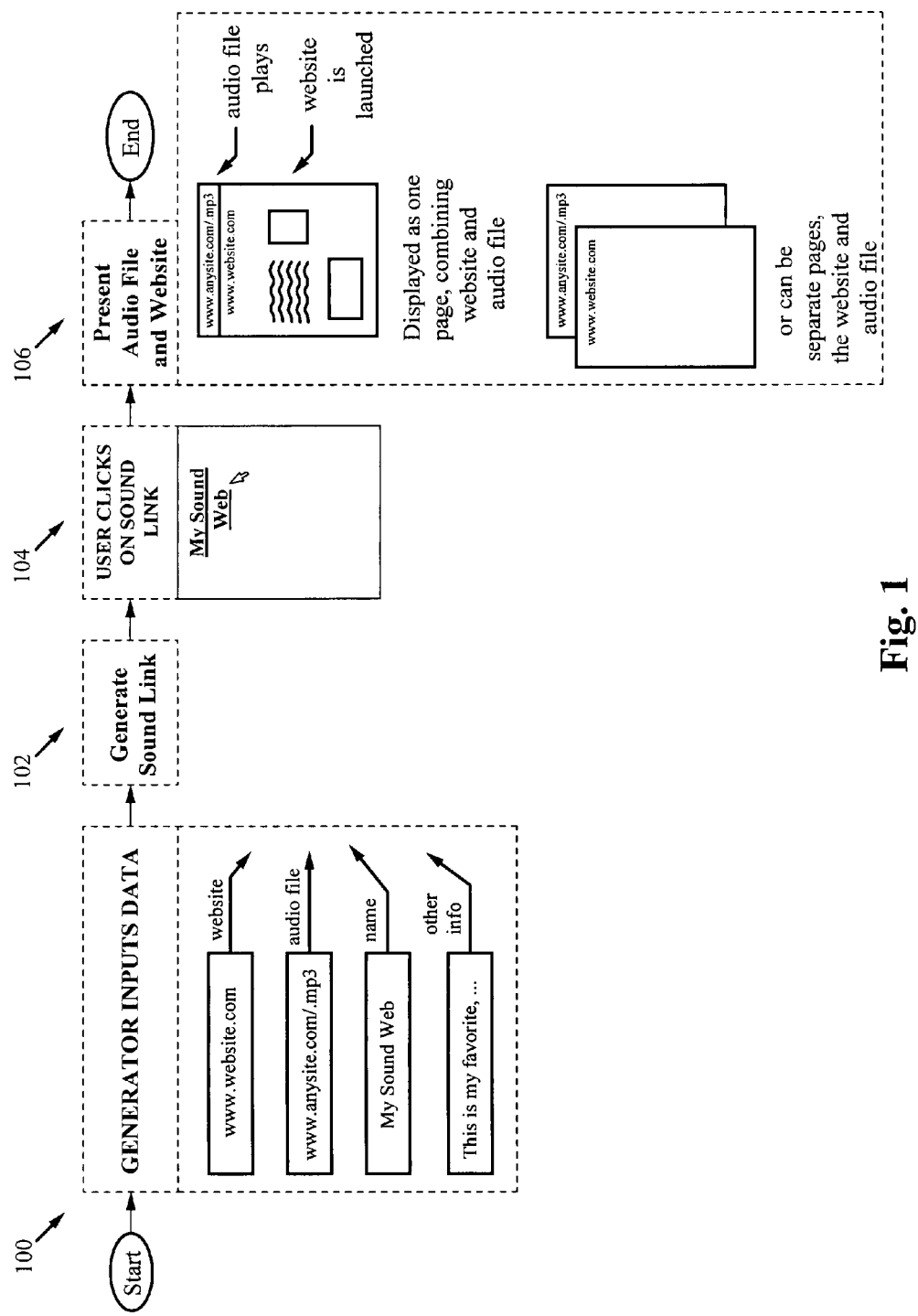
FIG. 1 illustrates a flow chart of a process of generating and using a Sound Link in accordance with the present invention.

An Audio-Website Link Generation and Access System allows someone with no special skills or special access to the source code or html of a website, to add audio to that website or any website, and generate a single link which plays audio and launches the website at the same time. As an example of this, a Sound Link looks like the following to a user:

Click Here to Launch this

The Sound Link is able to be any text, for example, the name of the website. When a user clicks on the Sound Link, which was generated by someone with no special skills and no access to the source code of the website, the Sound Link does two main things:

1. Launch the website associated with the Sound Link (for example: www.website.com)

2. Launch/play the audio associated with the Sound Link (for example: www.anywhere.com/ahello.mp3)

There has been a proliferation of both websites and audio files on the Internet, whereby today there are literally millions of both that exist. Websites generally have a .com, .net, .org or another type of extension (for example: www.website.com), and audio files have different extensions including but not limited to .mp3, .wav and .au (for example: www.anywhere.com/audio.mp3).

The Audio-Website Link Generation and Access System allows anyone on the Internet to decide that a specific audio file matches a specific website for a creative or business reason (for example: the audio might be funny when associated with the website, or the audio might provide more information to make the website more useful, or the audio might inspire the user to explore further on the website.) The person who matches the audio file and the website together is able to then generate a single Sound Link to launch the website and audio file together, and through any of many different means either publish or send the Sound Link to anyone on the Internet. On a grander scale, a search directory or search engine, such as Google® or Yahoo!®, is able to have audio files associated with each website that the search engine or directory displays, and these audio files are actually generated and published by users of the Audio-Website Link Generation and Access System, not by Yahoo!® or Google® themselves. So anyone is able to generate a Sound Link composed of a listing in a search engine or directory combined with an audio file, for example, giving their opinion on that website.

The Audio-Website Link Generation and Access System allows expanded use of audio on the Internet, as it relates to websites. The system is able to be used by anyone, not just the webmaster or people who control access to a website, but by anyone who wishes to generate a way for themselves, and for others, to launch a website in association with any audio file accessible on the Internet. In other words, anyone is able to view a website and an audio file, link them together in a Sound Link and publish that Sound Link for others to use. In some instances, the website and the audio are stored/hosted on different hosts.

The Audio-Website Link Generation and Access System is able to be used for many purposes, including but not limited to the following:

1. To generate voiceovers or audio tours of websites, which are able to be instructional, informational or entertaining. These voiceovers are able to be generated by anyone.

2. To associate interesting, ironic, clever or funny audio files with websites, such as a famous recorded line from an old movie that relates to the website.

3. Audio books, to relate audio recordings of books with their digital book counterparts on the Internet.

4. As personal greetings whereby a website and audio file are associated together for a specific person, for example for a birthday. Linking together a birthday audio file with the birthday person's favorite website, and then sending that person the Sound Link in an email.

5. To deepen or lengthen the experience of using a website, appropriate audio such as music is able to be used and Linked together with the website.

6. To offer audio commentary or opinion on the website, that is not directly related to the content of the website but is determined to be interesting. For example, a user is able to go to a news website, while hearing an opinion about the day's news from a voice audio file. Or that audio news file is able to be played along with any website using a Sound Link.

7. To express an opinion, using an audio file, about the website itself, so that other people on the Internet are able to hear this opinion about the website. This could also be used to get feedback from a selected group of individuals, allowing only certain people to hear this feedback, for example, in testing the effectiveness of a website.

8. For the seeing impaired, the audio track for a website is able to aid in communicating what the website is and does.

9. Advertising and promotion are able to be the main purpose of the audio file, which plays while users view the associated website.

10. For instructional purposes, on how to use the website.

11. Independent third parties are able to build up their own directories of websites with accompanying audio files, such that it is a "talking directory." Similar to a search engine or directory like Yahoo!® or Google®, except with accompanying audio files which is useful in determining how much time to spend on a website in the directory.

The above-listed purposes are intended as examples, and are not meant to limit the invention in any way. One of the main features of the Audio-Website Link Generation and Access System is that it allows any website and any audio file to be combined into a Sound Link, so as with other Internet-related technologies, it is anticipated that new and interesting uses of the Audio-Website Link Generation and Access System will be found by people on the Internet, when they use their creative imagination. There are literally billions of unique Sound Links that are able to be generated using the Audio-Website Link Generation and Access System when one looks at the unique combinations of websites and audio files available for access on the Internet.

The Audio-Website Link Generation and Access System also allows a user to:

1. Bring together any website and any audio file accessible on the Internet and combine them. By website, this additionally includes any document, such as PDF file, or image, or other content where the content is displayed on the screen, or parts and segments of websites like files, documents, images and photos. The audio file and the website are able to reside anywhere where files are accessible by the Internet, including on hosted servers, on so-called file-sharing networks, on audio recording devices such as voice mail systems, and on personal computers or desktops, which are made accessible on the Internet through various "personal media server" software which allow a person's personal computer to act as a server whereby others access the content on the person's personal computer.

2. Generate a special link ("Sound Link") whereby anyone else, meaning not necessarily the person who generated the Sound Link, is able to click on the Sound Link, and the website and audio file are launched simultaneously, or very close together in time. This gives the person who clicks on the Sound Link the impression that the website has an audio track associated with it.

3. The Generator and publisher of the Sound Link, which ties together a website and audio file, is able to be anyone who uses the Audio-Website Link Generation and Access System, meaning it does not have to be the owner of the website.

4. The Sound Links are able to reside anywhere on the Internet, within other websites, which are not directly associated with the website or audio file on the Sound Link. As well, the Sound Links are able to reside in emails, blogs, or other places within the Internet. The Sound Links are also able to be placed in a database, so that they are able to be played back in a particular order, or they are able to be played back automatically, similar to an automated slide show, where pages of websites appear, accompanied by the corresponding audio tracks, while the user watches, without necessarily pressing any keys on the keyboard.

5. Generate a centralized directory of Sound Links, which are searchable, creating a website search engine whereby when the websites are launched, by clicking on the Sound Link, the websites have audio associated with them. The directory is able to be searched by multiple means, including the text associated with the website and audio recording, as well as newer means for actually searching the audio itself are able to be used.

The Audio-Website Link Generation and Access System functions as follows:

1. The person who wants to generate a Sound Link ("Generator") uses a name and password to enter into a Generate module of the Audio/Website Production and Linking System. Alternatively, the Audio-Website Link Generation and Access System is able to allow anyone to generate a Sound Link, without entering any information about themselves or a password. The Generate module allows the Generator to build, edit, delete, and manage all of the Sound Links that the Generator generates. This process occurs using a graphical user interface where the Generator is presented with open boxes or windows in which they fill in the information about the Sound Link which they want to generate.

2. The graphical user interface includes a window to enter the URL of a website, a window to enter the URL of an audio file, and a window to enter the name or title of the Sound Link. There are multiple other items which the Generate module is able to contain to allow the Generator to add information which is published in association with the Sound Link, or is kept non-published but associated with the Sound Link so that the Generator is able to access it.

3. The Generate module has several places to input information, the three most important places being: the URL of the website which is going to be used for creating the Sound Link, the URL of the audio file which is going to be used for the Sound Link, and the name or title of the Sound Link, meaning the words used to name the Sound Link, which someone clicks on to the launch the Sound Link.

4. The Generator inputs information including the website, audio file location and name. This is able to be done by typing in the information, or using the cut and paste method, so the information comes from somewhere else and is "cut and pasted" into the correct place on the Generate module. Or the information is also able to be spoken into the Generate module, using voice recognition software which converts the spoken words into usable information to generate the Sound Link. For the website and audio file URL, the Generator is able to cut and paste the information from the window while either of those is present on the computer screen, meaning when the website is launched the user is able to cut the URL for the website, and when the audio file is launched, the Generator is able to cut the URL for the audio file from that screen while the audio file is launched.

5. The Generator also enters in additional information about the Sound Link which the Generator is going to generate, including descriptive information, subject or other information which will either be published with the Sound Link or is able to be used for administrative purposes.

6. When the appropriate information is input by the Generator, the Generator then pushes the Generate or Build button in the Generate module, which indicates that the Generator wishes to now build the Sound Link.

7. The Audio-Website Link Generation and Access System then uses a computing device and a scripting language to associate or embed the website and audio file and text description of the Sound Link together as one unit, such that when the Sound Link is launched or accessed, both the website and the audio file are seen and heard respectively. There are multiple methods of creating a computer program or statement using computer and scripting languages, for example, in HTML there are several ways, including the BGSOUND, EMBED, META, and FRAMES. Using HTML, for example, an HTML page, which is a template that does not yet have the input from the Generator, is generated using the Audio-Website Link Generation and Access System which then uses the input from the Generator of the system and makes an HTML page which places the appropriate information from the Generator's input into an HTML statement or page that is designed specifically to receive this input. The HTML page with the Generator's input information is able to reside anywhere, not necessarily within the HTML or source code of the website, but is a part of the Audio-Website Link Generation and Access System, meaning it is able to be accessed by anyone on the Internet using the Audio-Website Link Generation and Access System. The page that the Generator generated does not access the source code of the website that is launched by the Sound Link, nor does this page that was generated require any specialized skills. There are other methods of playing audio on the Internet that are able to be utilized by the Audio-Website Link Generation and Access System, for example, Adobe Flash is able to play an audio file "on the fly", meaning it is able to play back right when it is generated, using such tools as VBScript and Actionscript. This is useful when testing combinations of audio files and websites, for the Generator, and needing immediate feedback as to whether or not to use a particular Sound Link. Using the Audio-Website Link Generation and Access System, the Generator is able to use all the capabilities of HTML and other programming and scripting languages, to do such things as set the amount of time for the audio to play then stop, or do delayed audio playback, or switch between audio files. For example, in an instructional Sound Link, a program is able to allow for 10 seconds and then ask "Do you need help?" in the audio file playback.

Then, the Audio-Website Link Generation and Access System uses the information input from the Generator and the name or title that the Generator input as the title of the Sound Link, and makes the name of the Sound Link, so that it is underlined, as is customary on the Internet, or it is able to be in bold letters or there might be no visual indication at all that the name of the Sound Link is able to be clicked on. However, when the name of the Sound Link is clicked on, the Sound Link then launches the audio file(s) and website(s) associated with the Sound Link, regardless of how the Sound Link is displayed to the end-user. The Audio-Website Link Generation and Access System is able to add an insignia or character, for example, an asterisk or infinity sign, which differentiates a Sound Link from a regular Internet Link, allowing the user to know before clicking on the Sound Link that it is a Sound Link. In this way, prior to clicking on a link that is a Sound Link, the user knows that it is a Sound Link as opposed to a regular link that only launches a website, without the audio file.

8. Alternatively, there are able to be multiple websites and multiple audio files associated with a Sound Link. This means that in the Generate module, the Generator is able to put in multiple URL's for both the websites and audio files. Or there are able to be multiple audio files, with only one website, or multiple websites with only one audio file. The Generator is able to then generate a "talking slide show" where the user launches the Sound Link once, and then multiple websites and/or audio files appear. These websites and audio files are able to be displayed and heard through one of several techniques including being able to be timed together, meaning that at specific time intervals, which are put in by the Generator, the website and/or audio file changes. Or they are able to be associated by the way the user of the Sound Link desires to use the Sound Link. For example, a user clicks and then the website and/or audio file changes. Or they might change according to other specifications, including the duration of the audio file, meaning when the first audio file finishes, the website and/or audio file changes. The Generator inputs this additional information in the Generate module. In the Audio-Website Link Generation and Access System, a website is any type of content that is accessible via that Internet, including a single file, a photo, or something else.

9. Other features of the Generate module include the ability to edit or modify existing Sound Links and add information such as relationships between Sound Links.

10. Sound Links are able to be joined together, so that multiple Sound Links which have been previously generated, are joined to make one Sound Link whereby the multiple websites and audio files, from the individual Sound Links, are launched by the user clicking on one Sound Link. This is different than associating multiple audio files with one Sound Link, as previously outlined. In this case, finished Sound Links are able to be linked together to generate a "macro" Sound Link consisting of multiple finished Sound Links.

11. After the Sound Link has been generated, it is able to be used in several ways, some that are automatically generated by the Audio-Website Production and Linking System, and others which are choices of the Generator or user of the Sound Link. The Sound Links are able to be automatically put in directories whereby they are organized by topic, interest, name of Generator, and other information to make these accessible to the users of the Sound Link. Sound Links are able to be rated or organized in other ways depending on their characteristics.

12. The HTML code for the Sound Link is generated by the Audio-Website Link Generation and Access System and is able to then be taken by the Sound Link Generator or anyone which the Audio-Website Link Generation and Access System determines should have access to this feature, and that HTML for the Sound Link is able to be put on websites, blogs, in emails, and other areas on the Internet. The Sound Link is transportable. The Sound Link is able to be moved to other parts of the Internet which are not directly associated with the system, but the results of the Generate module, whereby a template was filled in by the Generator, are able to be inserted into other parts of the Internet, the assumption being that the code generated by the Generate module is written in a language, such as HTML, that is usable by the system which the Sound Link is transported to.

13. A Link to that specific Sound Link is generated, allowing someone from a website, blog, or in an email, to then Link directly to that specific Sound Link. This means that the Sound Link is able to be accessed from anywhere on the Internet.

14. The Audio-Website Link Generation and Access System also has a User module, which allows users to use Sound Links in different ways. The basic way in which a Sound Link is used, is the user clicks on the Sound Link which simultaneously launches a website and an audio file. The User module contains many Sound Links organized by such things as interest, topic, rating, Generator, and all of this information is also searchable. So after browsing or searching for a Sound Link, a user launches a Sound Link by clicking on the Sound Link.

15. The preferred method of launching a Sound Link is to launch the website in a browser window, and at the top of the window is the audio player, meaning a small version of the screen that launches the audio file. This means they are joined together in one unit, the website and the audio file. The advantage of this method is that the user is able to see the audio play buttons, such as start and stop, so that the user has control over their audio without, for example, having to manually turn off their speakers to stop the audio or without using the computer's main audio control buttons. Alternatively, the website might be launched and the audio file window also launched in full, preferably behind the website window, so the website is able to be seen first without the user needing to do any additional moving of the windows. Alternatively, the website is able to be launched without any access to the audio player, the sound just plays and there is no alternate screen to see the audio player.

16. In the User module, a user is also able to rate each Sound Link, read additional information about the Sound Link which has been put in by the Generator, see associated Sound Links, or send an email to a friend telling them about the Sound Link.

17. If an email is sent to a friend, the friend is able to then click on a Link and either the Sound Link will automatically open, or the friend is brought back to the page with contains the Sound Link, in which case the friend is able to then click on the Sound Link.

18. There are other associated modules for the Audio-Website Link Generation and Access System including a module for assisting people in recording their own original audio files and placing the audio files on the Internet, a module for helping Generators find audio files on the Internet, and a module for allowing other websites to put the full Audio-Website Link Generation and Access System on their website, allowing Sound Links to be generated in multiple locations on the Internet, not just in one location where a single Audio-Website Link Generation and Access System resides. The assumption in the Audio-Website Link Generation and Access System is that the audio file and the website combined to make a Sound Link have already been generated prior to using the Audio-Website Link Generation and Access System. However, in some embodiments, the Audio-Website Link Generation and Access System are able to be integrated and combined with other systems, such as a system allowing for the recording of audio, so that once an audio file is recorded it is immediately available to be placed in the Audio-Website Link Generation and Access System. Or, for example, multiple websites are able to be predesignated as needing audio files, and then by combining the Audio-Website Link Generation and Access System with an audio recording system, a person with a voice is able to record audio for each website, and while recording that audio, that audio is combined with each respective website with the Audio-Website Link Generation and Access System.

FIG. 1 illustrates a flow chart of a process of generating and using a Sound Link in accordance with the present invention. In the step 100, a Generator inputs data. For example, the Generator inputs a website address, an address/location of the audio file to be played in conjunction with the website address, a name/title for the Sound Link and additional information. In the step 102, the Sound Link is generated by a computing device implementing a program and/or script. In some embodiments, generating the Sound Link includes making the Sound Link available for display or transportation to a website, an email, a blog or another location. In the step 104, a user clicks on the Sound Link. Upon clicking the Sound Link, the audio file and the website are presented, in the step 106. In some embodiments, the audio file and the website are displayed as one page, and in some embodiments, the audio file and the website are displayed as separate pages.

FIG. 2 illustrates several of the main ways in which a Sound Link is able to be accessed by a user, in accordance with the present invention. The ways include clicking from a website 200 where there is a collection of Sound Links, clicking within an email 202 to launch the Sound Link, and clicking within a blog 204 to launch the Sound Link. In websites, the Sound Links are able to be ordered as desired such as by categories in the website 200, by date in a website 200', by Generator in a website 200", by rating in a website 20''' or another criteria. In some embodiments, the links are accessed in other ways beyond clicking such as tabbing and hitting the enter key.

FIG. 3 illustrates a graphical user interface 300 that is used to receive data to generate a Sound Link in accordance with the present invention. A Generator inputs the Website URL, Audio file location or URL, title of the Sound Link, their name, and a description. Additional information is able to be input as well, including, but not limited to, geographic information, time of generation and subject category of website. The data is input using text boxes or a similar mechanism for receiving data. The data is then submitted by pressing the enter key or clicking a generate button.

Figure 4:
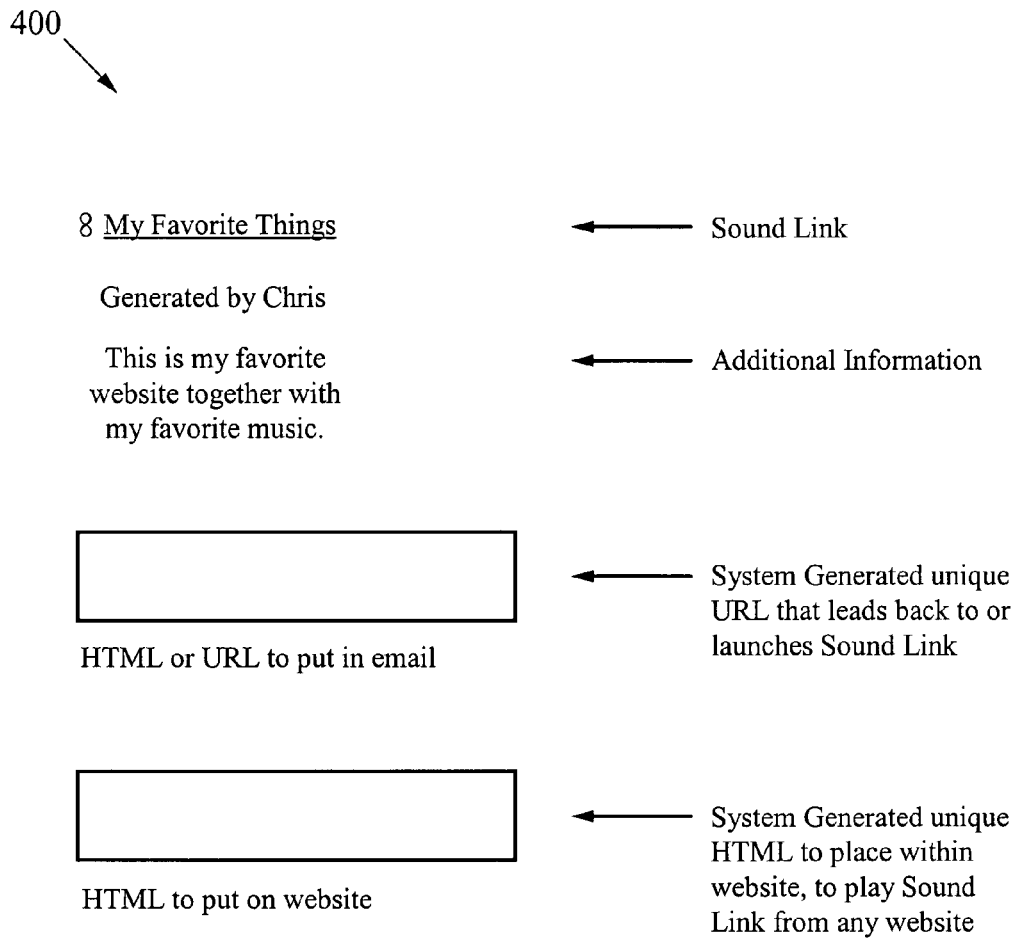
FIG. 4 illustrates the output after the Generator has input the information for a Sound Link and pressed the generate button.

FIG. 4 illustrates the output after the Generator has input the information for a Sound Link and pressed the generate button. The information, including the Sound Link itself, is then available for anyone to use, including clicking on the Sound Link and reading the information entered by the Generator. Additionally, certain information is generated by the Audio-Website Link Generation and Access System, including the HTML or URL that is needed to place the Sound Link within an email, to Link back to or launch the Sound Link from there. As well, the HTML is generated, allowing anyone to place or embed the Sound Link within any website.

Figure 5:
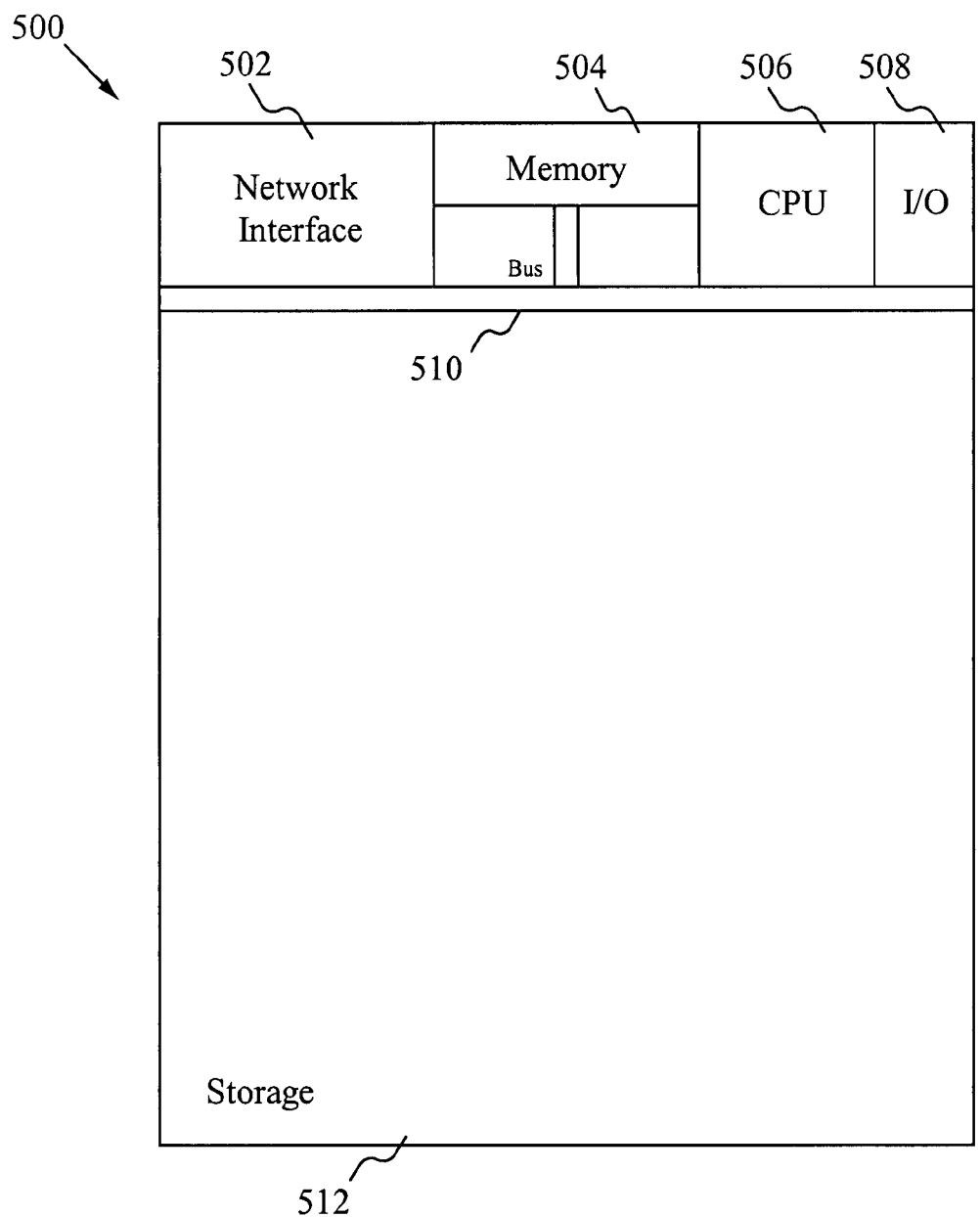
FIG. 5 illustrates a graphical representation of an exemplary computing device in accordance with the present invention.

FIG. 5 illustrates a graphical representation of an exemplary computing device 500 in accordance with the present invention. A Generator uses the computing device 500 to view and input desired data. The computing device 500 is then used in conjunction with the Audio-Website Link Generation and Access System to generate a Sound Link. Users then use the same or a separate computing device to access Sound Link. In general, a hardware structure suitable for implementing the computing device includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, flash memory card or any other appropriate storage device. The computing device is able to include one or more network interfaces 502. An example of a network interface includes a network card connected to an Ethernet or other type of LAN. The I/O device(s) 508 are able to include one or more of the following: keyboard, mouse, monitor, display, printer, modem and other devices. Software used to perform the methods of the present invention are likely to be stored in the storage device 512 and memory 504 and processed as applications are typically processed.

Examples of suitable computing devices include a personal computer, laptop computer, computer workstation, a server, mainframe computer, handheld computer, personal digital assistant, cellular/mobile telephone, smart appliance, gaming console or any other suitable computing device.

Figure 6:
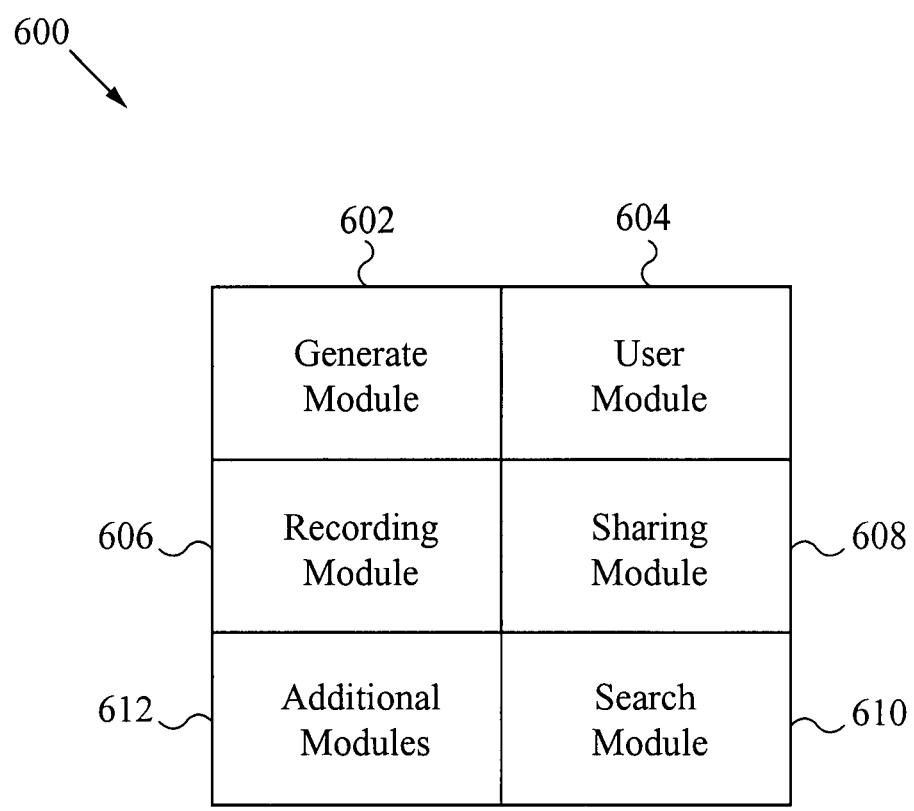
FIG. 6 illustrates a block diagram of an Audio-Website Link Generation and Access System in accordance with the present invention.

FIG. 6 illustrates a block diagram of an Audio-Website Link Generation and Access System 600 in accordance with the present invention. The Audio-Website Link Generation and Access System 600 includes a Generate module 602, a User module 604, a Recording module 606, a Sharing module 608, a Search module 610 and additional modules 612. In some embodiments, fewer or additional modules are included. The Generate module 602 allows the Generator to build, edit, delete, and manage all of the Sound Links that the Generator generates. The User module 604 allows users to use the Sound Links in different ways. The basic way in which a Sound Link is used, is the user clicks on the Sound Link which simultaneously launches a website and an audio file. The User module 604 contains many Sound Links organized by such things as interest, topic, rating, Generator, and all of this information is also searchable. So after browsing or searching for a Sound Link, a user launches a Sound Link by clicking on the Sound Link. In the User module 604, a user may also rate each Sound Link, read additional information about the Sound Link which has been put in by the Generator, see associated Sound Links, or send an email to a friend telling them about the Sound Link. The Recording module 606 assists people in recording their own original audio files and placing the files on the Internet. The Sharing module 608 allows other websites to put the Audio-Website Link Generation and Access System 600 on their website, allowing Sound Links to be generated in multiple locations on the Internet. The Search module 610 helps Generators find audio files on the Internet. Additional modules 612 are able to be included in the Audio-Website Link Generation and Access System 600 such as a website Generator and other modules.

To utilize the Audio-Website Link Generation and Access System, a Generator enters in information though the use of a graphical user interface. The information includes the location of the website, the location of the audio file, the chosen name of the Sound Link and any other desired information. After inputting the information, a Sound Link is generated using a computing device with the appropriate programs/scripts. The Sound Link is then able to be posted on a website, sent via email or displayed as desired. Then, when a user clicks on the Sound Link, both the website and the audio component will be opened simultaneously or approximately simultaneously.

In operation, the Audio-Website Link Generation and Access System enables users to combine online content for a better user experience. This allows users to generate new online content using preexisting content. As an example of the applicability of the Audio-Website Link Generation and Access System, in the past, using known technology, when someone wanted to point out hypocrisy of a political candidate where the candidate flip-flops on an issue, the user simply wrote in text or maybe even copied a sound clip or video to his website showing the hypocrisy. However, to make a more powerful point, using the Audio-Website Link Generation and Access System, the user is able to use a Sound Link which links to the website which states one thought by the political candidate and plays the hypocritical sound clip at the same time.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the appended claims.

What is claimed is:

1. An apparatus for generating a sound link comprising:
   a. a processor; and
   b. an application processed by the processor that generates a new sound link by combining a first webpage address link to a webpage file for a pre-existing webpage with a second webpage address link to an audio file location for an audio file, wherein the application comprises:
      a webpage component configured to receive data from a user representing pre-existing webpage location information;
      an audio component configured to receive data from the user representing audio file location information; and
      a display component configured to display the new sound link on the computing device after the new sound link has been generated by a generation component;
   wherein the new sound link opens both the pre-existing webpage and the audio file when selected.

2. The apparatus of claim 1 wherein the application includes a graphical user interface for receiving input.

3. The apparatus of claim 2 wherein the input includes a webpage address, an audio file address and a name.

4. The apparatus of claim 1 wherein the webpage is hosted by a first host and the audio file is hosted by a second host.

5. The apparatus of claim 1 wherein the webpage is configured to open simultaneously with the audio file upon selection of the new sound link.

6. A method of presenting a pre-existing webpage and an audio file utilizing a computing device comprising:
   a. inputting information into the computing device, wherein the information comprises a webpage location of the pre-existing webpage and an audio file location of the audio file;
   b. generating a new sound link with an application on the computing device by combining a webpage address link to the webpage location with a link to the audio file location;
   c. displaying the new sound link on the computing device with a display component of the application after the new sound link has been generated by a generation component;
   d. displaying the webpage upon selection of the new sound link; and
   e. commencing playing of the audio file upon selection of the new sound link while simultaneously commencing displaying of the pre-existing webpage upon the selection of the new sound link.

7. The method of claim 6 wherein the information is input using a graphical user interface.

8. The method of claim 7 wherein the input includes the webpage address, the audio file location and a name.

9. The method of claim 6 wherein the webpage and the audio file are presented on a single page.

10. The method of claim 6 wherein the webpage and the audio file are presented on two separate pages.

11. The method of claim 6 further comprising emailing the sound link.

12. A non-transitory computer readable media comprising a system for administering a sound link, the system comprising:
    a. a webpage component configured to receive data from a user representing pre-existing webpage location information;
    b. an audio component configured to receive data from the user representing audio file location information;
    c. a generation module configured for generating a new sound link by combining a webpage address link for a pre-existing webpage with a link to an audio file location for an audio file; and
    d. a display component configured to display the new sound link after the new sound link has been generated by the generation module;
    wherein the new sound link opens both the pre-existing webpage and the audio file when selected.

13. The system of claim 12 further comprising a recording module operatively coupled with the generation module, the recording module for recording the audio file.

14. The system of claim 12 wherein the generate module is further configured for editing, deleting and managing the sound link.

15. The system of claim 12 wherein the generate module further comprises a graphical user interface for receiving input.

16. The system of claim 15 wherein the input includes a webpage address, an audio file address and a name.

17. A non-transitory computer readable media storing an interface for presentation on a computing device and for generating a sound link, the interface comprising:
    a. a webpage component configured to receive textual data from a user representing pre-existing webpage location information;
    b. an audio component configured to receive textual data from the user representing audio file location information;
    c. a name component configured to receive textual data from the user representing a name of a new sound link;
    d. a generation component operatively coupled to the webpage component, the audio component and the name component and configured to generate the new sound link based on the webpage location, the audio file location and the name; and
    e. a display component for displaying graphical representations of the webpage component, the audio component, and the name component on the computing device, wherein the display component is capable of receiving input comprising the textual data through the graphical representations.

18. The apparatus of claim 1 wherein the application is further for recording an audio file.

19. The method of claim 6 further comprising recording an audio file.

20. A method of presenting a pre-existing webpage and an audio file utilizing a computing device comprising:
   a. inputting information into the computing device using a graphical user interface, wherein the information comprises a webpage location of the pre-existing webpage and an audio file location of the audio file;
   b. processing the information using an application, wherein the application generates a new sound link by combining a webpage address link to the webpage location with an audio file link to the audio file location without modifying code of the pre-existing webpage;
   c. displaying the new sound link on the computing device with a display component of the application after the new sound link has been generated by a generation component;
   d. displaying the pre-existing webpage upon selection of the new sound link; and
   e. commencing playing of the audio file upon selection of the new sound link while simultaneously commencing displaying of the pre-existing webpage upon the selection of the new sound link.

21. The method of claim 20 wherein the pre-existing links on the pre-existing webpage point to one or more locations that are each distinct from a location of the audio file associated with generated new sound.

22. The interface of claim 17 wherein the display component is configured to display the new sound link on the computing device after the new sound link has been generated by the generation component.

23. The apparatus of claim 1 wherein the second webpage address link is not a part of the data forming file of the pre-existing webpage.

24. The apparatus of claim 1 wherein the new sound link separately points to the webpage file and the audio file.

* * * * *